July 4, 1933.   J. W. BARTLETT   1,916,551
METHOD OF REMOVING IMPURITIES FROM GAS
Filed Sept. 2, 1930
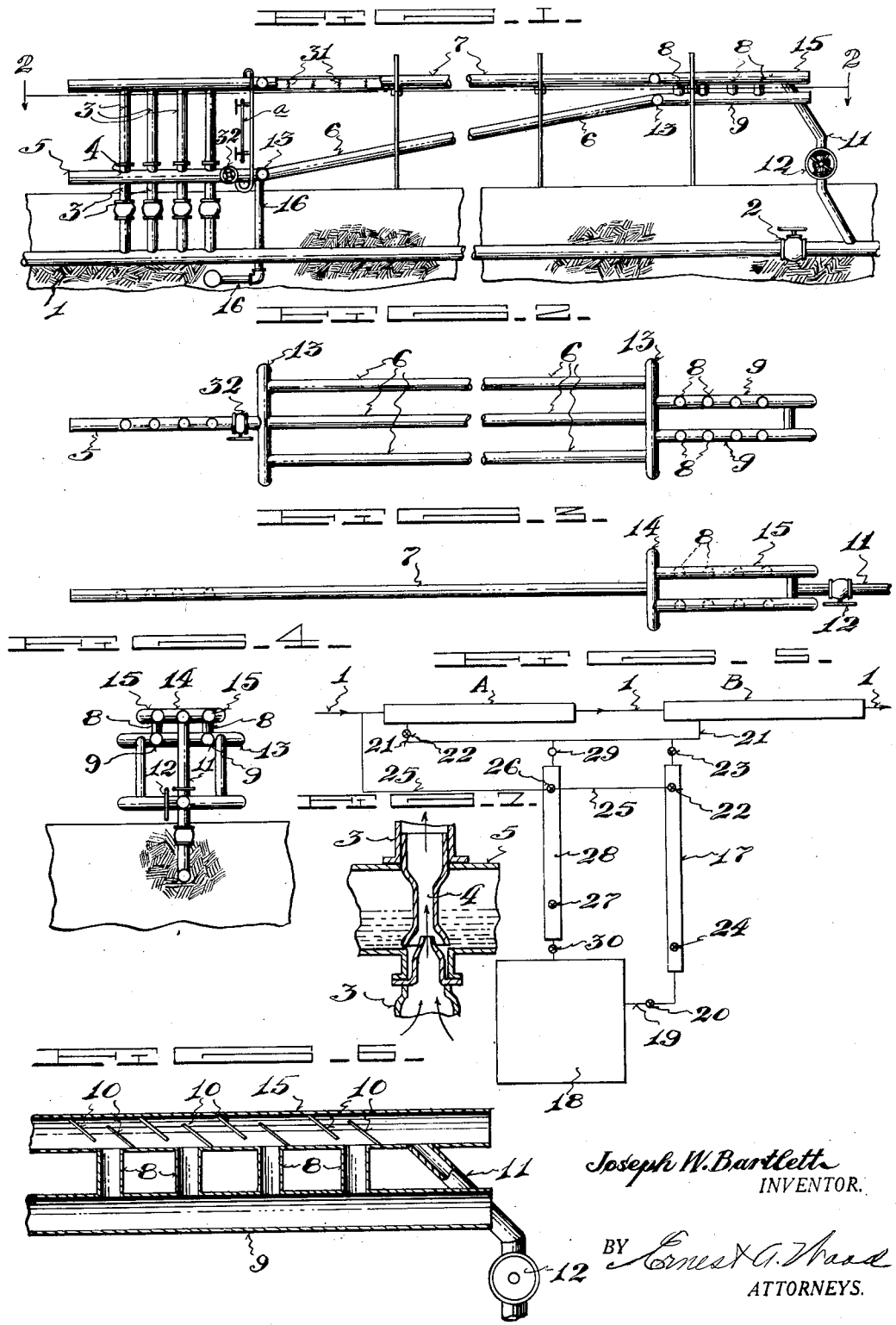
Joseph W. Bartlett
INVENTOR.
BY Ernest G. Thaad
ATTORNEYS.

Patented July 4, 1933

1,916,551

UNITED STATES PATENT OFFICE

JOSEPH W. BARTLETT, OF DALLAS, TEXAS

METHOD OF REMOVING IMPURITIES FROM GAS.

Application filed September 2, 1930. Serial No. 479,256.

This invention relates to apparatus and method for effecting the removal of hydrogen sulphide or other impurities from gas and it has particular reference to an improved method for removing such impurities from natural gas as the latter issues from the well or in conjunction with its transportation in pipe lines and the principal object of the invention resides in an improved apparatus and method for bringing the gas into intimate contact with a liquid solution which will absorb the impurities and allow the gas to continue its course, practically free from impurities as an industrial fuel.

Another object of the invention resides in the provision of an apparatus and method so designed and calculated that the purifying liquid may be a water solution of sodium carbonate, commonly known as soda ash in view of its cheapness and its quality for being regenerated.

Still another object of the invention resides in the extreme simplicity of the improved treating plant or apparatus, it being understood that the normal flow of pressure of the gas is not interrupted to any appreciable degree by being subjected to the treating process for the removal of impurities therefrom.

The invention hereinafter described is what is generally known as a batch process, that is, a quantity of the solution is placed in the treating apparatus and is not continually replaced but remains therein until the soda ash is spent. It is then drained out and is replaced by fresh solution after having been regenerated.

The spent solution may be regenerated by any suitable or desirable means. In the case of soda ash as an absorbing medium for hydrogen sulphide, the solution is regenerated by aeration, which is accomplished by forcing it over the top of an aerating tower or by blowing air through the liquid, or in fact by spraying the liquid. It is preferred however, that an aerating tower be employed in combination with an auxiliary means for blowing air through the solution, especially in cold weather.

It is intended that the invention shall be arranged in units which are connected in series. This will allow for replacement of spent solution in one unit while the other unit is functioning in its normal capacity, that of removing impurities such as hydrogen sulphide from the gas, and will also provide additional assurance of substantially complete removal of the impurities during such time as more than one unit is in operation. The invention is provided with a series of injectors through which the gas is passed and which reduces the normal pressure of the gas approximately from 5 to 20 pounds. This drop in pressure is the force which operates the entire process.

In very cold weather, the solution when aerated is inclined to freeze and in order to prevent this, the solution may be run directly into the pond below the aerating tower and aeration may then be effected by simply blowing the air through the solution. Moreover, the entire plant may be conveniently placed below the surface of the ground and covered, which fact will assist in preventing the solution from freezing in cold weather and it is further pointed out that without altering the invention in any manner, steam or hot water coils may be installed in the various reservoirs, ponds and etc. to prevent freezing.

With the foregoing objects as paramount, the invention has particular reference to the improved method hereinbefore briefly defined, as well as to its salient features of construction and arrangement of parts constituting the apparatus by which the method is obtained and which will be more fully explained in the course of the following description, taken in connection with the accompanying drawing, wherein;

Figure 1 is a side elevational view of an apparatus by which the method of the invention is obtained.

Figure 2 is a plan view of the bottom portion of the structure shown in Figure 1.

Figure 3 is a plan view of the top portion of said structure.

Figure 4 is an end elevational view taken at right of Figure 1.

Figure 5 is a diagrammatic view of the complete process, showing the invention in two units connected in series.

Figure 6 is a fragmentary elevation of the discharge end of the apparatus showing the baffles for the separation of the gas and liquid after subjection to the purifying process, and Figure 7 is a fragmentary sectional view of one of the injectors used in the assembly.

Continuing more in detail, it is pointed out that the principal advantage of the present invention is that it is free from moving parts, it being pointed out that conventional methods require the use of pumps for obtaining and maintaining continuous circulation of the solution from the aerator through a continual current reaction chamber, from which it is discharged only partially spent. Operation of pumps and engines is obviously expensive especially when pumping against high pressures and while in the present process, there is a slight wastage of gas, such wastage is regarded as negligible since the saving more than compensates for the cost of more expensive equipment, as well as the cost of maintenance of conventional types of gas purifying plants, and is not appreciably greater than the wastage of gas resulting from the conventional method caused by gas being carried out in solution in the partially spent solution. It is to be pointed out further that where other methods secure intimate contact by the circulation of large quantities of liquid, the present improved method makes use of rapid circulation of the same batch.

In the drawing, 1 designates the gas main which has a valve 2 spaced from a series of vertical communicating pipes 3. The drawing shows the gas main as being below the surface of the ground, but it is pointed out that the entire apparatus except the aeration tower will operate equally as efficiently should the same be completely buried.

The pipes 3, which are arranged in parallel relationship have situated in each of these pipes an injector 4 as shown in Figure 7. The injectors have communication with the horizontal portion 5 of an angularly disposed series of pipes 6 which form the receptacle in which the purifying liquid or soda ash solution is contained. The pipes 3 continue upward and communicate with a horizontal pipe 7 in which the gas and purifying solution is intimately mixed under pressure.

It will be observed in Figure 1 that the angularly disposed or inclined arrangement of pipes 6 continue on a straight course parallel with the upper horizontal pipe 7 at the right of Figure 1 and has connection therewith through a series of short pipes 8. This horizontal portion of the pipes 6 is designated at 9 in Figures 1 and 6. That portion of pipe 7 next adjacent the portion 9 of the inclined pipe has therein a series of staggeringly arranged baffles 10, as shown in Figure 6 exclusively, although other means of separating gas from liquid may be used.

The purifying solution which is carried into the chamber or pipe 7 is baffled out or otherwise separated and re-enters pipe 6 through the several spaced pipes 8, while the gas, after having been washed and purified returns to the main line 1 through pipe 11 in which there is a valve 12.

The pipe assembly of which the liquid chamber is composed, which includes pipes 5, 6 and 9 is provided with cross heads 13, since pipe 7 in which the gas is introduced to bring about intimate contact with the solution must correspond with the drainage end of the solution chamber or with pipes 9 thereof, the said pipe 7 must be provided with a cross head 14 having two pipes 15 communicating therewith, which is the portion containing the baffles 10, shown in Figure 6. To one of the cross heads 13 of the pipe assembly 6 is connected a drain line 16, to which reference will be later made.

Referring now to the diagrammatic arrangement shown in Figure 5, the purifying units are designated at A and B. There is provided what is termed herein a loading reservoir 17 which is filled with a fresh solution drained by gravity from an open reservoir or pond under the aerating tower 18 through pipe 19 controlled by valve 20. There is also provided a loading line 21 which also serves as a drain line for the units A and B and valves 22 are in control of these lines. There is also a valve 23 in the loading reservoir drain line.

In operation, valve 23 is closed as well as valve 20 and the vent valve 24. High pressure gas from line 25 is allowed to enter the loading reservoir 17 from the main line 1, by manipulating the valve 26. As this pressure is from the high pressure side of the injectors 4, the pressure in the main line 1 is now higher than in the unit A. Injectors 4 as shown in Figure 7 are inlet valve injectors and are concealed within the pipe 5. Valve 27 is now opened, which is the vent valve on the unloading reservoir 28. By opening valves 22 and 29 the solution in the unit A is allowed to flow into the unloading reservoir 28, assisted by pressure in unit A. When the solution from unit A has been depleted and emptied into the unloading reservoir 28, valve 29 is closed and valve 23 is opened. The pressure in the loading reservoir 17 being greater than in the unit A, solution in the said reservoir is forced into the unit A. When discharge is complete, as shown by the gauge glass $a$, Figure 1, valves 22 and 23 may be closed. High pressure gas to reservoir 17 is shut off and the pressure therein is relieved by opening the valve 24. Refilling of the reservoir 17 is accomplishd by opening valve 20 in line 19 which communicates with the pond under the aerating tower 18.

To regenerate spent solution in the unloading reservoir 28, valve 27 is closed while valve 30 is opened. Gas pressure is then turned into reservoir 28, which forces solution for reservoir 28 over the top of the aerating tower 18. Descension of the solution down through the tower 18 causes the solution to lose its combined (and dissolved) hydrogen sulphide to the atmosphere. The solution then settles in the pond, previously mentioned, below the aerating tower.

In cold weather the solution would be likely to freeze in the tower 18 and to prevent this, the solution may be run directly into the pond whereupon aeration may then be effected by blowing air through the solution.

Gas enters the treating unit A through one or more lines, each of which lines includes a valve and each line leading to an injector 4. In passing through the pipes 3 and injectors 4 from the main line 1, the gas picks up a portion of liquid solution as shown in Figure 7, the pressure breaking the liquid up into a spray, thereby assisting in obtaining intimate contact in the pipe 7. The spray also moistens the surface of the contact material 31, which is preferably screen wire arranged in the reaction chamber or pipe 7. This further insures intimate contact of the gas with the solution.

After passing through the reaction chamber 7 in which the impurities are absorbed, the gas and liquid solution enter the separator, such separation being augmented by the baffles 10, which allow gas to follow the line of least resistance and pass out through the discharge line 11 while the liquid is constrained to drain back into the pipes 6 through the pipes 8 to be re-circulated. An adjustable check valve 32 permits the liquid solution to flow from the reservoir 6 into the injector header 5, but prevents gas from passing through the reservoir and out through the return lines from the separator.

The invention has been described with great particularity and it is believed to be obvious that a considerable saving is obtainable through the medium of its use, since all parts thereof are fixed and its operation is not dependent upon pumps or other equipment for the building up of operating pressure, it being pointed out that the pressure of the gas alone in the main line 1 is sufficient to carry the purifying solution for each complete cycle as well as effecting aeration to rid the same of absorbed impurities and return the same to its position for intimate contact with the gas. Examination of the purified gas will determine the condition of the solution and whether or not aeration is required.

Manifestly, the construction shown is capable of considerable modification and such modification as is considered within the scope and meaning of the appended claims is also considered within the spirit and intent of the invention.

What is claimed is:

1. The herein described process for the removal of $H_2S$ from gas characterized by forcing the gas through nozzles surrounded by a $Na_2CO_3$ solution to form a suspension thereof in the gas stream in maintaining suspension of the solution in a finely divided state and finally in baffling out the suspended liquid from the gas and returning the same to its source.

2. The herein described process for removing $H_2S$ from gas which consists initially in blowing the gas through a $Na_2CO_3$ solution by its own pressure to form a suspension of said solution in said gas in a finely divided state; in baffling out said solution at a multiplicity of points during progressive transit of the gas stream; in returning the solution by gravity for recirculation and finally in regenerating the spent solution.

3. The herein described process for the removal of $H_2S$ from gas characterized in initially bypassing the raw gas through injectors under pressure, in surrounding said injectors with a $Na_2CO_3$ solution, whereby to form a suspension thereof with the gas throughout the reaction period, in baffling out the solution from the gas to allow the gas to emerge after absorption of its impurities by said solution, in aerating said solution to remove impurities therefrom and finally in returning said solution for recirculation.

4. The herein described process for the removal of $H_2S$ from natural gas characterized by initially forcing the gas through injectors under its own pressure and in submerging said injectors in a solution of sodium carbonate whereby finely divided quantities of said solution will be drawn into the gas stream and suspended therein while said gas is in transit, then in separating out the solution from the gas, in returning the solution to its source for recirculation and finally in regenerating the solution when spent.

5. The herein described process for the removal of $H_2S$ from gas which consists initially in blowing the gas under its own pressure through nozzles surrounding by a $Na_2CO_3$ solution and then atomizing the latter to a finely divided suspension thereof in the gas stream, then in separating out the solution from the gas stream and returning the same to its source and finally in regenerating the spent solution for recirculation.

6. The herein described process for removing $H_2S$ from gas characterized by initially forcing the gas under its own pressure through injectors surrounded by a $Na_2CO_3$ solution, whereby finely divided quantities of said solution will be drawn into and held in a suspended state in the gas stream throughout the reaction period, then in separating the solution from the gas to return the same to its source by the action of gravity for recirculation until partially or wholly spent, and finally in regenerating the spent solution.

7. The hereindescribed process for the removal of $H_2S$ from gas which consists initially in continuously forcing said gas under its own pressure through a storage of $Na_2CO_3$ solution to obtain an atomized mixture to be held in suspension during transit of the gas to a point of exit, in baffling off the solution from the gas and in returning the solution by gravity to storage for recirculation or regeneration.

In testimony whereof I affix my signature.

JOSEPH W. BARTLETT.